Jan. 11, 1955

H. M. JENKINS, JR 2,699,360

ORNAMENTAL ANNULUS FOR AUTOMOBILE WHEELS

Filed June 27, 1952

INVENTOR.
HOWARD M. JENKINS JR.
BY
Arthur M. Smith
ATTORNEY

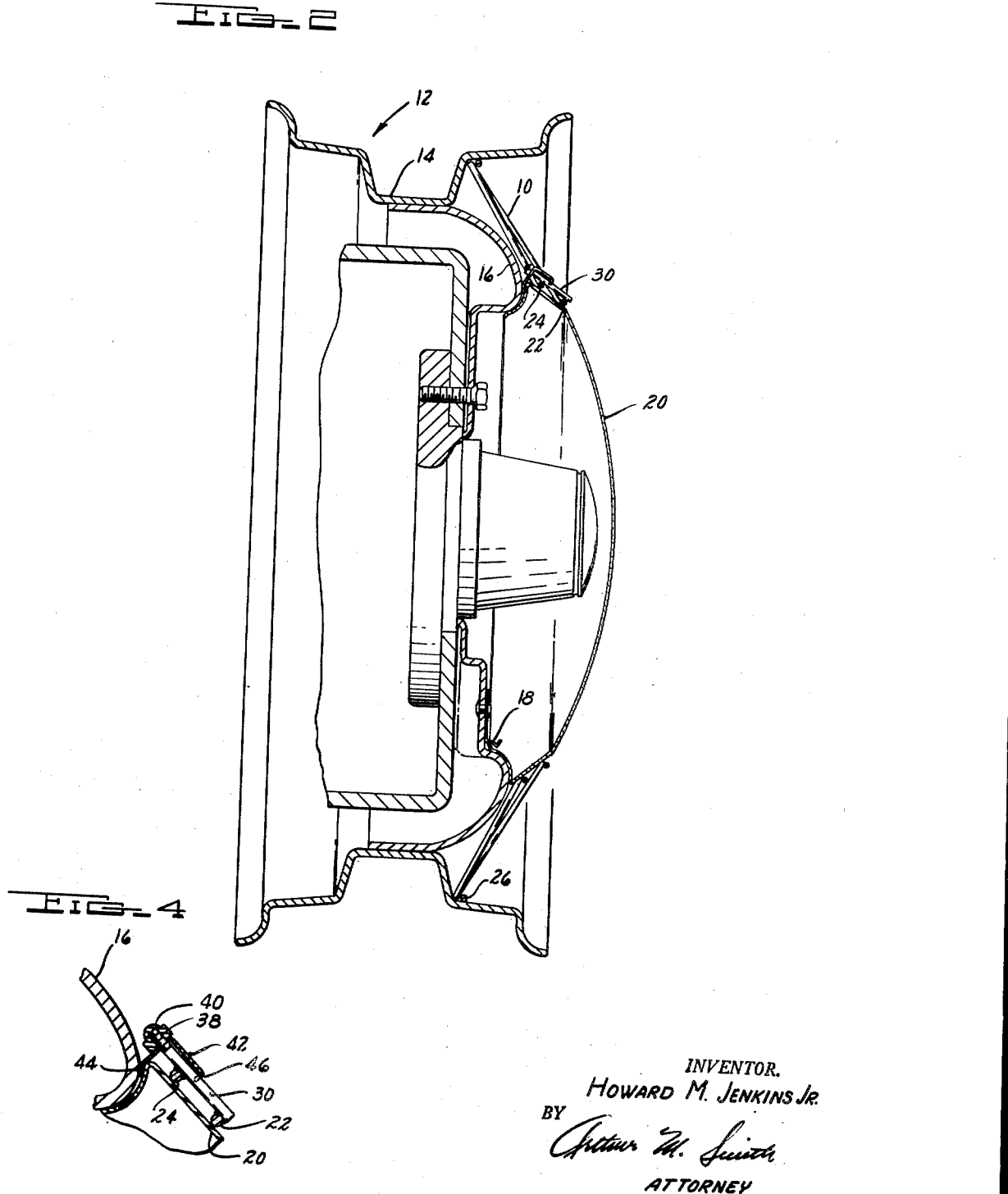

United States Patent Office 2,699,360
Patented Jan. 11, 1955

2,699,360

ORNAMENTAL ANNULUS FOR AUTOMOBILE WHEELS

Howard M. Jenkins, Jr., Detroit, Mich., assignor to Van Auken, Inc., Detroit, Mich., a corporation of Michigan Application June 27, 1952, Serial No. 295,865

10 Claims. (Cl. 301—37)

The present invention relates to an ornamental device for a wheel and more particularly to an annulus adapted to be disposed between the rim and hub of an automobile wheel to simulate a wire wheel construction.

This invention is a continuation-in-part of my copending application, Serial No. 292,453, filed June 9, 1952, in which it was explained that recently there has been a desire in the automobile industry to manufacture certain models of cars with wire wheels. This has been particularly true in connection with sport models such as convertibles, or the like, because these models are considered to have a more attractive appearance when wire wheels are used. However, the automobile manufacturers have not responded to the demands for such wheels because wire wheels are more costly to make and do not have all the strength characteristics of the conventional wheels now in use.

The primary object of the present invention is to provide an ornamental annulus which may be easily attached to a conventional automobile wheel assembly and which is formed from wire elements which simulate wire wheel spokes.

It is another object of the present invention to provide an ornamental annulus of the foregoing character which has retaining clips for attaching it to the periphery of the hub cap so that it will be disposed between the rim and hub cap of the wheel assembly.

It is still another object of the present invention to provide an ornamental annulus simulating the spoke construction of a wire wheel, said annulus being constructed and arranged so that it can be secured in position without requiring any modification or change in the conventional wheel assembly.

It is still another object of the present invention to provide an ornamental annulus simulating the spoke construction of a wire wheel, said annulus being constructed and arranged to be disposed between rim and hub cap portions of the wheel assembly and to be attached to at least one of said portions.

Other objects of this invention will appear in the following description and appended claims, reference being had to the accompanying drawings forming a part of this specification wherein like reference characters designate corresponding parts in the several views.

In the drawings:

Fig. 2 is a sectional view taken on the line 2—2 of Figure 1 illustrating the annulus mounted in position on a conventional wheel assembly;

Fig. 4 is an enlarged fragmentary view of one retaining clip used to attach the annulus to the hub cap of the wheel assembly.

Figure 1:
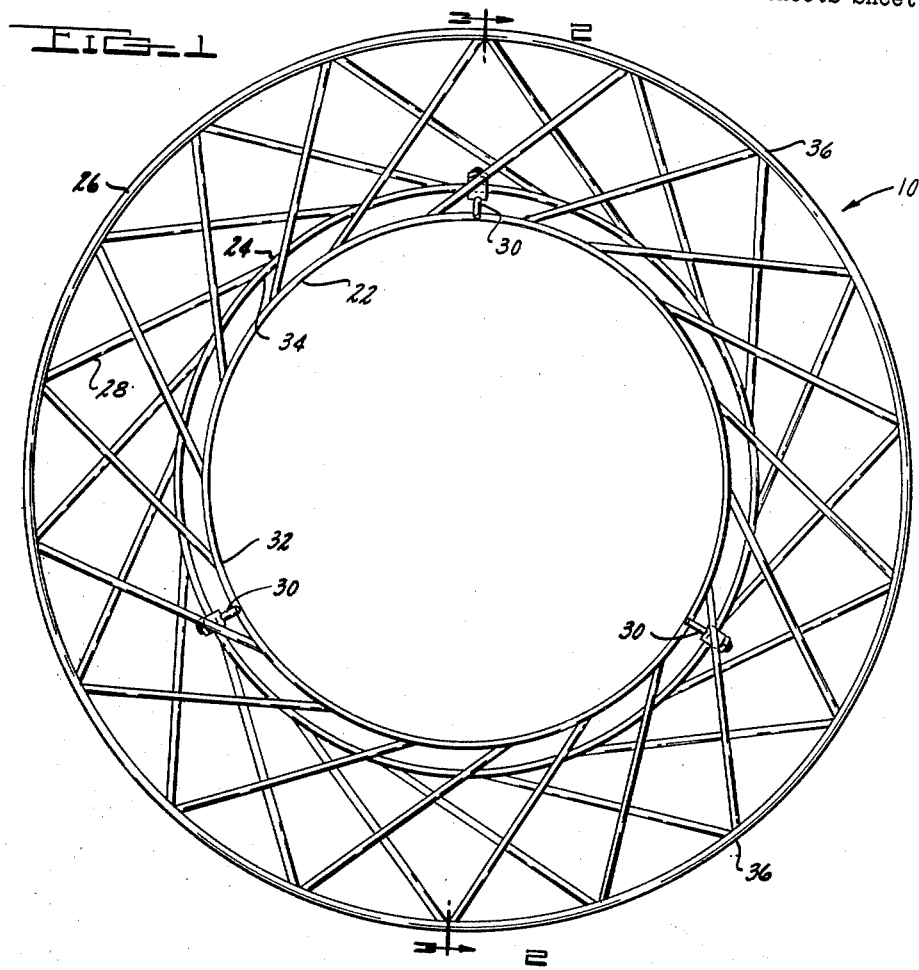
Fig. 1 is a front elevation of an ornamental wire annulus embodying the present invention.
Figure 3:
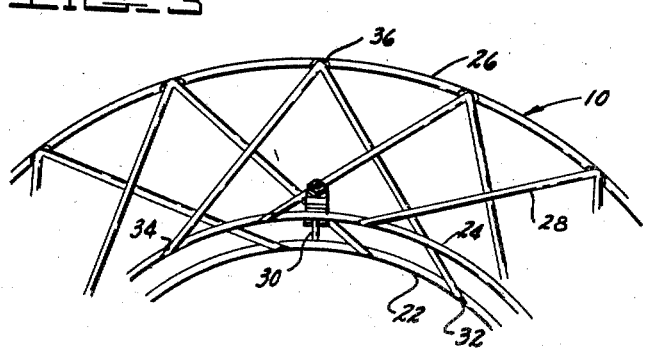
Fig. 3 is a fragmentary rear elevation of the ornamental wire annulus.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings for a more detailed description, one embodiment of the present invention can be seen. In Figure 2 a cross section of a wheel assembly is shown which includes the novel ornamental annulus 10. The conventional wheel 12 comprises a rim portion 14 and a body or hub portion 16. Secured to the front side of the hub portion 16 by a plurality of spring fingers 18 is a hub cap 20. The wheel 12 and hub cap 20 are well known constructions in the automobile industry and the specific details shown in the drawings form no part of the present invention. It is to be understood that any conventional wheel and hub cap construction may be used with this invention.

The ornamental wire annulus 10 includes three wire rings 22, 24 and 26 which are connected by a plurality of wire elements 28. Also connecting rings 22 and 24 are a plurality of braces 30 which will be described in greater detail later.

Each of the wire elements 28 are similarly constructed and arranged and only one of such elements will be described. Each wire element 28 is V-shaped with one end being connected to the ring 22 as at 32, and the other end being connected to the ring 24 as at 34. The lower end of the V-shaped element is connected to the ring 26 as at 36. These connections may be made in any suitable manner such as by brazing or welding.

The braces 30 serve a two fold purpose. They retain the rings 22 and 24 in axially spaced apart relation so that these rings seat against the hub cap 20. They also aid in attaching the wire annulus 10 to the wheel assembly. The end of each brace 30 is threaded at 38, Figure 4, to which end an acorn nut 40 may be threadedly connected. Each nut 40 holds a retaining clip 42 in position under the peripheral edge of the hub cap 20. As seen in Figure 4, the clip 42 has its one end 44 extending under the inner edge of the hub cap 20. Clip 42 has an aperture through which the brace 30 extends, and said clip then extends longitudinally of the brace 30 and has its end 46 saddled over the brace 30.

From the foregoing description it can be seen that the ornamental wire annulus 10 can easily be attached to any conventional wheel assembly without requiring any modification or change in the construction of such assembly. It is only necessary that the hub cap 20 be removed and the annulus be attached thereto. Thereafter the hub cap 20 is pressed back into its normal position on the hub portion 16 of the wheel.

It is believed readily understood how the annulus 10 is attached to the hub cap 20. With the retaining clips 42 held loosely in place by the nuts 40, the annulus 10 is placed over the hub cap 20. The ends 44 are placed under the peripheral edge of hub cap 20 and the nuts 40 are then screwed tightly onto the braces 30 rigidly clamping the annulus 10 to hub cap 20. After this operation is completed the hub cap 20 may be pressed onto the wheel and the ornamental wire annulus 10 will be disposed between the rim portion 14 and edge of the hub cap 20 to simulate wire spokes of a conventional wire wheel construction.

Thus, it can be seen that a very simple ornamental wire annulus has been provided which can be disposed between the rim and hub portions of the wheel assembly to simulate a wire wheel construction. This annulus is constructed and arranged so that it can be easily attached to new or used wheel assemblies to effect improved appearances.

Having thus described my invention, I claim:

1. A wheel cover assembly for a motor vehicle wheel comprising a hub-cap adapted to be secured to a wheel and a spoke-like wire annulus attached to said hub cap by a plurality of retaining clips.

2. A wheel cover assembly for a motor vehicle wheel comprising a hub cap adapted to be secured to a wheel and a spoke-like wire annulus having a plurality of retaining clips around its inner periphery, the diameter of said inner periphery being smaller than the diameter of said hub cap to permit said annulus to be seated on the hub cap and to be clamped thereto by the retaining clips.

3. As an article of manufacture, an automobile ornamental wheel cover structure for disposition between the rim and hub cap of the wheel assembly comprising a plurality of rings with spoke-like wire elements connecting such rings, and a plurality of retaining clips mounted on said annulus for attaching the same to a hub cap.

4. As an article of manufacture, an automobile ornamental wheel cover structure for disposition between the rim and hub cap of the wheel assembly comprising an outer ring adapted to seat on a portion of the rim of the wheel, a pair of inner rings of different diameters adapted to seat on the outer periphery of the hub cap, a plurality of spoke-like wire elements connecting the outer ring with the inner rings, and a plurality of spacer elements connecting said inner rings to maintain them in radial and axial spaced relation.

5. As an article of manufacture, an automobile ornamental wheel cover structure for disposition between the rim and hub cap of the wheel assembly comprising an outer ring adapted to seat on a portion of the rim of the wheel, a pair of inner rings of different diameters adapted to seat on the outer periphery of the hub cap, a plurality of spoke-like wire elements connecting the outer ring with the inner rings, and a plurality of retaining clips connected with said inner rings for clamping the same to the hub cap.

6. As an article of manufacture, an automobile ornamental wheel cover structure for disposition between the rim and hub cap of the wheel assembly comprising an outer ring adapted to seat on a portion of the rim of the wheel, a pair of inner rings of different diameters adapted ot seat on the outer periphery of the hub cap, spoke-like wire elements connecting the outer ring with the inner rings, spacer elements connecting said inner rings to maintain them in radial and axial spaced relation so that they will seat properly on said hub cap, and retaining clips for clamping the inner rings to said hub cap.

7. In combination with a hub cap and a wheel, a spoke-like wire annulus having retaining clips around its inner periphery for clamping the annulus to the periphery of said hub cap.

8. In combination with a hub cap and a wheel having a rim portion, a spoke-like wire annulus having retaining clips around its inner periphery clamping the annulus to the periphery of said hub cap, the outer periphery of said annulus being seated on said rim portion.

9. As an article of manufacture, an automobile ornamental wheel cover structure for disposition between the rim and hub cap of the wheel assembly comprising three concentric rings one of which has a larger diameter than the other two, and a plurality of spoke-like wire elements connecting such rings, each of said elements being V-shaped with the base of the V being secured to the larger ring and the distal ends thereof being secured respectively to the other two rings.

10. As an article of manufacture, an automobile ornamental wheel cover structure for disposition between the rim and hub cap of the wheel assembly comprising three concentric rings one of which has a larger diameter than the other two, and a plurality of spoke-like wire elements connecting such rings, some of said elements joining the larger ring and one of the inner rings, and other of said elements joining the larger ring and the other of the inner rings.

References Cited in the file of this patent

UNITED STATES PATENTS

| 1,510,048 | Evans | Sept. 30, 1924 |

FOREIGN PATENTS

| 714,587 | France | Nov. 17, 1931 |
| 769,819 | France | Sept. 3, 1934 |
| 462,025 | Great Britain | Feb. 26, 1937 |